United States Patent [19]

Dessirier

[11] Patent Number: 5,009,557
[45] Date of Patent: Apr. 23, 1991

[54] ASSEMBLY DEVICE AND PROCESSES OF USING SAID DEVICE

[75] Inventor: Charles Dessirier, Bouclans, France
[73] Assignee: Bost S.A., Laissey, France
[21] Appl. No.: 496,022
[22] Filed: Mar. 20, 1990
[30] Foreign Application Priority Data
Mar. 20, 1989 [FR] France ................. 89 03957
[51] Int. Cl.$^5$ ............................................. F16B 19/06
[52] U.S. Cl. ......................... 411/504; 411/506; 29/524.1; 29/525.2
[58] Field of Search ............. 411/361, 500, 501, 504, 411/505, 506, 507; 29/522.1, 524.1, 525.2

[56] References Cited

U.S. PATENT DOCUMENTS

| | | | |
|---|---|---|---|
| 669,965 | 3/1901 | Jamison | 411/504 |
| 1,947,906 | 2/1934 | Fine | 411/504 |
| 2,482,391 | 9/1949 | Webster | 411/361 |
| 3,426,641 | 2/1969 | Rosman | 411/361 |
| 3,551,015 | 12/1970 | Whiteside et al. | 411/504 |
| 3,680,429 | 8/1972 | Briles | 411/504 |
| 3,869,956 | 3/1975 | Breer | 411/506 |

Primary Examiner—Neill R. Wilson
Attorney, Agent, or Firm—Oblon, Spivak, McClelland, Maier & Neustadt

[57] ABSTRACT

An assembly device for permanently joining at least two parts includes a rivet element having a head and a rod formed of a material which is deformable by compression, and a washer having an opening through which the rod extends when the rivet element is assembled to the parts to be joined with the head abutting one of the parts and the rod extending through the parts. A volume of the opening in the washer is at least equal to the volume of the rod projecting from the parts to be joined when the rivet element is asembled thereto. Assembly while maintaining a degree of freedom between the parts to be joined can be provided by selecting the rivet elements so that the height of its section closest to the rivet head is at least equal to the thickness of the part being joined which is abutted by the head.

5 Claims, 1 Drawing Sheet 5,009,557

ASSEMBLY DEVICE AND PROCESSES OF USING SAID DEVICE

FIELD OF THE INVENTION

This invention relates to an assembly device similar to a rivet and a method of using the same.

BACKGROUND OF THE RELATED ART

Various means are known for creating a connection between two parts, i.e. the arms of a clamp, so as to permanently join them, while optionally preserving at least a degree of freedom, for example rotation or relative sliding of the two parts. Bolts or rivets can be cited in particular for this purpose.

Rivets make it possible to assemble two parts in a particularly economic and quick way. They nevertheless exhibit the drawback of typically requiring additional finishing operations to obtain a satisfactory aesthetic appearance.

Further, if rivets are used to join two parts while having to maintain a degree of freedom between them, the precision of assembly sufficient to guarantee a perfectly controlled play is difficult to achieve. Thus, the clamps whose arms are joined by the rivets often exhibit an unacceptable friction due to a poor control of the play existing after the installation of the rivets.

SUMMARY OF THE INVENTION

This invention has as an object to eliminate this drawback by providing an assembly device making it possible to joint two parts permanently and optionally with a degree of freedom, in a way as simple and economical as a rivet, with a better control of the existing play and a more satisfactory aesthetic appearance.

This invention relates more particularly to an assembly device consisting, on the one hand, of a rivet element comprising a head and a rod deformable by compression, and, on the other hand, of a washer pierced with an opening with a volume at least equal to the volume of the projecting end of the rod when the rivet element is assembled to two pieces to be joined.

After installation of the rivet, the parts to be joined and the washer, an axial pressure is exerted with a snap-head riveting machine, preferably one with a helical movement, to deform the end of the rod until it fills the opening of the washer.

The assembly thus made exhibits a great solidity and a completely satisfactory degree of finishing without any recourse to an additional operation such as machining or polishing.

Preferably, the washer has an opening whose lateral edges converge or otherwise exhibit a lateral taper.

The section of the opening of the washer and of the rod of the rivet can, for example, be square, triangular or hexagonal, but according to an advantageous embodiment the rod is cylindrical and the opening is cone-shaped or consists of two coaxial, cylindrical bores with different diameters.

According to an advantageous embodiment, the rod consists of at least two coaxial sections, the cross-section of each section approximately corresponding to the section of the opening of one of the parts to be assembled and the height of one of said sections being at least equal to the thickness of one of said parts to be assembled. This embodiment makes it possible to form an assembly allowing a degree of freedom to exist between the assembled parts. This degree of freedom can be either a rotation in the case of cylindrical rivets, or a translation in the case of rectangular section rivets.

Advantageously, the rivet and the washer are made of steel intended for cold striking. Of course, other materials can be used, in particular alloys or moldable materials that are deformable when hot or cold.

This invention also relates to an assembly process comprising piercing each part to be assembled with an opening, inserting a rivet in said openings, placing on the projecting part of the rivet rod a washer equipped with an opening having a volume of at least equal to the volume of the projecting part of the rod, and exerting an axial pressure on said rivet.

According to a preferred embodiment, a prior treatment of the assembly device and/or the parts to be assembled is performed. This treatment generally consists of a heat treatment. The advantage which is derived from the prior treatment is that any stress able to modify the play existing between two assemble parts can be eliminated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
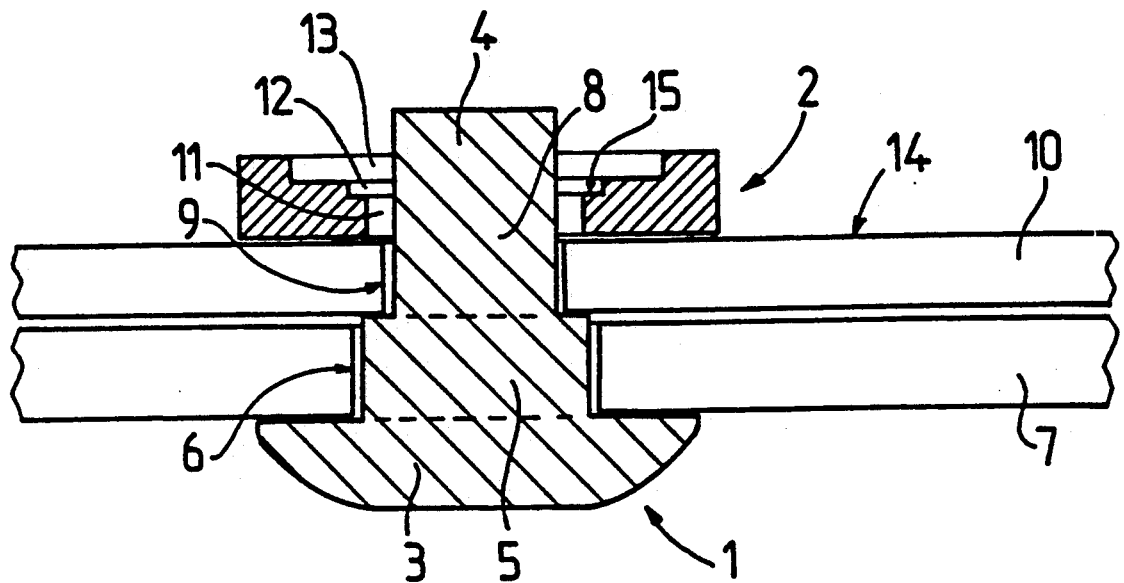
FIG. 1 is a view in section of an assembly device according to the invention during installation.

The assembly device as shown in FIG. 1 consists of a rivet 1 and a washer 2. Rivet 1 comprises a head 3 and a rod 4. Rod 4 consists of a first cylindrical section 5, with a diameter slightly less than the diameter of opening 6 made in first part 7 to be assembled and a height greater than the thickness of the first part 7. Rod 4 also comprises a section 8 with a diameter slightly less than opening 9 of second part 10 to be assembled.

Washer 2 consists of a disk having an opening consisting of three bores 11, 12, 13 with progressively increasing diameters. The volume of the first two bores 11, 12 corresponds approximately to the volume of the end of rod 4 of the rivet projecting beyond outside surface 14 of second part (plate) 10 to be assembled.

When rivet 1 and washer 2 are in place as shown in FIG. 1, an axial pressure is exerted on the rivet, preferably with an oscillating snap-head riveting machine, to crush the end of rod 4 until it fills the first two bores 11, 12 of washer 2.

Figure 2:
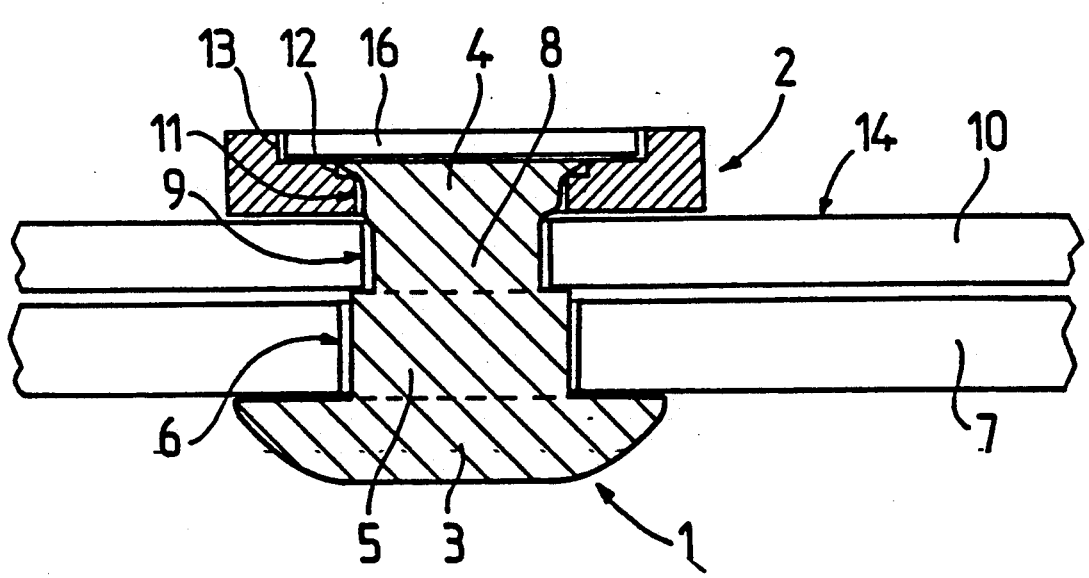
FIG. 2 shows a view in section of the installed assembly device.

As shown in FIG. 2, a permanent bonding of the washer with the rivet thus is achieved. In the embodiment shown, first part 7 maintains a degree of freedom in rotation because the height of first section 5 of rod 4 of rivet 1 is greater than the thickness of part 7. The play existing between the two parts 7 and 10 can be adjusted with high precision by selecting the height of first section 5 with precision.

In the embodiment shown, third bore 13, with a larger diameter, makes it possible, after crushing of end 4 of the rod of rivet 1, to place a small decoration or marking disk 15 which is fitted in the third bore.

According to a particular example, rivet 1 and the washer 2 consist of steel of type 38 B 3 tempered before assembly at 360° C. in oil. This treatment is completed by a tempering at 350° C. for a half-hour. Rivet 1 comprises a head with a diameter of 16 mm. Rod 4 consists of a first cylindrical section with a diameter of 8.4 mm and a second section with a diameter of 6.5 mm. The height of the first section is 3.8 mm and the height of the second section is 7.5 mm. The thickness of the parts to be assembled is 3.7 mm. The washer exhibits an outside diameter of 18 mm and comprises an opening consisting of three bores with diameters of 8 mm, 9.6 mm, and 14 mm respectively. The height of the bore with the smallest diameter is 1.9 mm, the heights of the following ones are 0.5 and 0.6 mm, respectively, The crushing of the end of the rod is performed by an oscillating snap-head riveting machine, exerting a pressure of about 1,500 kg. A decoration disk of self-adhesive aluminum is installed in the bore with the largest diameter after assembly.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An assembly device for permanently joining at least two parts, comprising:
    a rivet element having a head and a rod formed of a material which is deformable by compression; and
    a washer having an opening through which said rod extends when said rivet element is assembled to the parts to be joined with said head abutting a first one of the parts and said rod extending through the parts to be joined,
    wherein a volume of said opening is at least equal to a volume of said rod projecting from the parts to be joined when said rivet element is assembled to the parts to be joined with said head abutting the first of the parts,
    wherein the walls of said washer defining said opening have a lateral shoulder, and
    wherein said opening comprises three coaxial cylindrical bores having progressively increasing diameters in a direction away from the rivet head when the rivet element is assembled to the parts to be joined, and wherein the volume of the two bores closest to the rivet head is substantially equal to the volume of said rod projecting from the parts to be joined when said rivet element is assembled to the parts to be joined.

2. The assembly device of claim 1 including a decorative disk insertable in the bore furthest from the rivet head when the rivet element is assembled to the parts to be joined.

3. A method of assembling at least two parts, comprising the steps of:
    piercing holes in said parts to be assembled;
    selecting a rivet element having a head and a rod, and selecting a washer having an opening, said rivet element and said washer being selected such that a volume of said opening is at least equal to a volume of the rod projecting from the parts to be joined when the rivet element is assembled to the parts with the head abutting one of the parts;
    assembling the rivet element to the parts to be joined with the head abutting one of the parts;
    deforming said rod so as to join said rod to said washer; and
    heat treating said rivet element and said washer prior to said assembling step.

4. The method of claim 3 wherein said rod of said rivet element comprises at least two coaxial sections of different diameters, including the step of selecting a rivet element having a rod section closest to the rivet head whose height is at least equal to said one of the parts to be joined.

5. The method of claim 3 wherein said heat treating step comprises tempering said rivet element and said washer to eliminate stresses therein.

* * * * *

UNITED STATES PATENT AND TRADEMARK OFFICE
CERTIFICATE OF CORRECTION

PATENT NO. : 5,009,557
DATED      : April 23, 1991
INVENTOR(S) : Charles Dessirier It is certified that error appears in the above-identified patent and that said Letters Patent is hereby corrected as shown below:

On the title page, item [30]:

The Foreign Application Priority Data is incorrect, should be,

--Mar. 20, 1989 [FR]  France ..................89 03597--.

Signed and Sealed this

Third Day of November, 1992

Attest:

DOUGLAS B. COMER

*Attesting Officer*       Acting Commissioner of Patents and Trademarks